United States Patent
Meppelder et al.

(10) Patent No.: US 10,472,439 B2
(45) Date of Patent: Nov. 12, 2019

(54) CATALYST SYSTEM AND PROCESS FOR THE PRODUCTION OF POLYETHYLENES

(71) Applicant: SABIC GLOBAL TECHNOLOGIES B.V., Bergen op Zoom (NL)

(72) Inventors: Geert Johannes Marinus Meppelder, Aachen (DE); Johannes Julian Matthias Kruck, Aachen (DE); Eric Johannes Cornelia Janssen, Geleen (NL); Robert Lap Key Chan, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 9 days.

(21) Appl. No.: 15/551,294

(22) PCT Filed: Mar. 10, 2016

(86) PCT No.: PCT/EP2016/055181
§ 371 (c)(1),
(2) Date: Aug. 16, 2017

(87) PCT Pub. No.: WO2016/150725
PCT Pub. Date: Sep. 29, 2016

(65) Prior Publication Data
US 2018/0030176 A1    Feb. 1, 2018

(30) Foreign Application Priority Data
Mar. 24, 2015  (EP) .................................... 15160476

(51) Int. Cl.
| | |
|---|---|
| C08F 210/02 | (2006.01) |
| C08L 23/06 | (2006.01) |
| C08F 4/649 | (2006.01) |
| C08F 2/00 | (2006.01) |
| C08F 4/642 | (2006.01) |

(52) U.S. Cl.
CPC ............ *C08F 210/02* (2013.01); *C08F 2/001* (2013.01); *C08F 4/6425* (2013.01); *C08F 4/6426* (2013.01); *C08F 4/6491* (2013.01); *C08L 23/06* (2013.01); *C08L 2203/18* (2013.01); *C08L 2207/062* (2013.01)

(58) Field of Classification Search
None
See application file for complete search history.

(56) References Cited

U.S. PATENT DOCUMENTS

| | | |
|---|---|---|
| 6,545,106 B1 | 4/2003 | Bian |
| 7,208,436 B2 | 4/2007 | Dall'occo et al. |
| 7,678,867 B2 | 3/2010 | Baita et al. |
| 9,127,095 B2 | 9/2015 | Brita et al. |

FOREIGN PATENT DOCUMENTS

| | | |
|---|---|---|
| EP | 0633270 A1 | 1/1995 |
| EP | 0728769 A1 | 8/1996 |
| JP | H03277611 A | 12/1991 |
| JP | H05255440 B2 | 10/1993 |
| JP | H11228635 A | 8/1999 |
| JP | 2004018697 A | 1/2004 |
| WO | 2007051607 A1 | 5/2007 |
| WO | 2013087167 A2 | 6/2013 |

OTHER PUBLICATIONS

Bent; "An Appraisal of Valence-Bond Structures and Hybridization in Compounds of the First-Row Elements"; Chemical Reviews; vol. 61, Issue 3; Jun., 1961; pp. 275-311.
International Search Report for International Application No. PCT/EP2016/055181; International Filing Date: Mar. 10, 2016; dated Jun. 1, 2016; 4 Pages.
Machine Translation of JPH03277611(A); Date of Publication: Dec. 9, 1991; 11 Pages.
PE 100 Pipe Systems, second edition, Heiner Bromstrup (editor), 2004, pp. 16-20 ISBN 3-8027-2728-2.
Written Opinion of the International Searching Authority for International Application No. PCT/EP2016/055181; International Filing Date: Mar. 10, 2016; dated Jun. 1, 2016; 6 Pages.

*Primary Examiner* — Catherine S Branch
(74) *Attorney, Agent, or Firm* — Cantor Colburn LLP

(57) ABSTRACT

The present invention relates to a catalyst system for the production of polyethylene comprising: I) the reaction product obtained by reacting a) a hydrocarbon solution comprising: i. a magnesium-containing compound selected from an organic oxygen-containing magnesium compound and/or a halogen-containing magnesium compound; and ii. an organic oxygen-containing titanium compound wherein the molar ratio of magnesium:titanium is lower than 3:1; and b) an organo aluminium halide having the formula $AlR_nX_{3-n}$ in which R is a hydrocarbon moiety containing 1-10 carbon atoms, X is a halogen and 0<n<3; II) an aluminium compound having the formula $AlR'_3$, in which R' is a hydrocarbon moiety containing 1-10 carbon atoms; and III) one or more of an electron donor selected from the group of 1,2-dialkoxy hydrocarbon compounds wherein the molar ratio of supplied organo aluminium halide I)b) to supplied titanium in I)a) in the preparation of I) is between 5.0 and 7.0; and the molar ratio of the electron donor III) to the titanium present in the reaction product I) is between 0.05 and 0.40 The production of polyethylene using said catalyst system results in a reduction of formation of ethane and a reduction of the hexane-extractable content of the polyethylene.

18 Claims, No Drawings

CATALYST SYSTEM AND PROCESS FOR THE PRODUCTION OF POLYETHYLENES

CROSS REFERENCE TO RELATED APPLICATIONS

This application is a 371 of International Application No. PCT/EP2016/055181, filed Mar. 10, 2016, which claims priority to European Application No. 15160476.6, filed Mar. 24, 2015 which are incorporated herein by reference in their entirety.

The present invention relates to a catalyst system for the production of polyethylenes, a process for the production of polyethylenes using said catalyst system, polyethylenes produced using said process, and pipes produced using said polyethylene.

Polyethylenes, in particular high density polyethylenes (HDPE) constitute a class of materials which have a balance of material properties that are particularly desirable for a range of applications, in particular for pipes and tubes produced via extrusion moulding processes. For example, high density polyethylenes may have a unimodal molecular weight distribution or a multimodal molecular weight distribution. Such unimodal molecular weight distribution or multimodal molecular weight distribution results in a particular balance of material properties.

Said multimodal molecular weight distribution may be achieved by employing for example two or more polymerisation reactors in cascade in the process for production of multimodal HDPE, further referred to as multi-stage polymerisation processes. Such multi-stage polymerisation processes are described in for example "PE 100 Pipe Systems", Bromstrup (ed), Vulkan Verlag, 2004, p. 16-20.

The process for production of polyethylenes may for example be performed in a process comprising a low-temperature low-pressure slurry polymerisation process. The slurry that is used in the slurry polymerisation process is defined as a liquid system comprising a diluent as liquid phase, feed monomers, the catalyst system and the polymer particles formed in the course of the polymerisation. As diluent, a hydrocarbon is used that is not reactive under the conditions occurring in the polymerisation process, and which is in a liquid phase under the conditions occurring in the polymerisation process. The diluent may for example be hexane. Low-pressure polymerisation is defined as polymerisation at partial pressures of ethylene in the range between for example 0.3 MPa and 5.0 MPa, alternatively between for example 0.5 MPa and 3.0 MPa, alternatively between for example 0.5 and 2.0 MPa. Low-temperature polymerisation is defined as polymerisation at temperatures in the range between for example 70° C. and 90° C.

The process for production of polyethylenes in accordance with the present invention may for example comprise a single polymerisation stage comprising a slurry polymerisation process, alternatively the process for production of polyethylenes may for example comprise multiple polymerisation stages, in which the process comprises at least a slurry polymerisation process. Said process for the production of polyethylenes comprising multiple polymerisation stages is also referred to as a multi-stage polymerisation process. Each individual stage of said multi-stage polymerisation process may comprise a separate polymerisation reactor, which are set up in cascade so as together to form said multi-stage polymerisation process. The operating conditions of each polymerisation reactor may different or may be the same as in the other polymerisation reactors in cascade together forming said multi-stage polymerisation process.

The polyethylenes according to the present invention may be unimodal or multimodal polyethylenes. Unimodal polyethylenes in the context of the present invention are defined as polyethylenes having a unimodal molecular weight distribution. Multimodal polyethylenes in the context of the present invention are defined as polyethylenes having a multimodal molecular weight distribution. The molecular weight distribution is defined as the relation between the molecular weight of a polymer molecule present in a polymer sample and the number of molecules in said polymer sample having said molecular weight. Said multimodal molecular weight distribution reflects the combination of the molecular weight distributions of the polyethylenes prepared in each stage of said multi-stage polymerisation process.

The molecular weight distribution of polyethylenes according to the present invention may be determined via Size Exclusion Chromatography such as presented in "Handbook of Polyethylene, structure, properties and applications", A. Peacock, Dekker, New York, 2000, pages 242-244.

Production of polyethylenes in slurry polymerisation processes in general takes place in the presence of a catalyst system. Such catalyst systems may for example comprise a catalyst, a cocatalyst and an electron donor.

In the context of the present invention, polyethylenes are to be understood to be the polymer products obtained as output of the polymerisation process.

Polyethylenes are described in 'Olefin Polymers, Introduction', Y. Kissin, in: Kirk-Othmer Encyclopedia of Chemical Technology, Wiley, 2005 (DOI: 10.1002/0471238961.0914201811091919.a01.pub2).

Suitable catalysts for the production of polyethylenes include Ziegler-Natta catalysts, Phillips-type chromium-based catalysts, and single-site catalysts such as metallocene catalysts. In polyethylene production processes, the process and the catalyst have to form a well-balanced system in order to arrive at products of the desired characteristics whilst allowing for an efficiently operating process.

The polyethylenes according to the present invention may for example be high density polyethylenes, further referred to as HDPE. The polyethylenes according to the present invention may for example be polyethylenes having a density as measured in accordance with ISO 1183-1 (2012), method A of ≥935 kg/m$^3$, alternatively for example ≥940 kg/m$^3$. The polyethylenes according to the present invention may for example be polyethylenes having a density of ≤975 kg/m$^3$, alternatively for example ≤970 kg/m$^3$, alternatively for example ≤965 kg/m$^3$. The polyethylenes according to the present invention may for example be polyethylenes having a density in the range of ≥935 kg/m$^3$ and ≤975 kg/m$^3$, alternatively for example in the range of ≥940 kg/m$^3$ and ≤970 kg/m$^3$, alternatively for example in the range of ≥940 kg/m$^3$ and ≤965 kg/m$^3$.

The polyethylenes according to the present invention may for example be multimodal HDPE.

The multi-stage polymerisation process for the production of multimodal HDPE requires that the catalyst is sufficiently sensitive to hydrogen, in order to produce a low molecular weight polymer fraction according to the desired characteristics of molecular weight distribution, whereas the catalyst should also have sufficient capability to produce a high molecular weight copolymer fraction.

The production of HDPE in slurry polymerisation processes according to the state of the art has a disadvantage in that a fraction of waxes is produced as by-product. In the context of the present invention, waxes are defined as the hexane-extractable content. The formation of waxes influences both the HDPE product properties as well as the process operations. A lower fraction of waxes means a higher yield in terms of the desired HDPE product obtained per quantity of monomer feed. In addition, waxes tend to induce clogging and/or fouling during the polymerisation and further processing of the HDPE material obtained from the polymerisation process. Thus it is evident that it is desirable to reduce the formation of waxes during multimodal HDPE production.

Another disadvantage of the production of HDPE in slurry polymerisation processes according to the state of the art is that a fraction of ethane may be produced as by-product. The formation of a fraction of ethane has a negative influence on the process economics and the yield of the process in terms of the quantity of HDPE material obtained per unit of ethylene raw material that is introduced to the process.

Multimodal HDPE may for example be used for processing into objects via blow moulding, extrusion moulding or injection moulding. Multimodal HDPE may for example be used to produce films, pipes, tubes, and pipe fittings. Examples of multimodal HDPE pipes are pipes for drinking water, sewage, irrigation, natural gas transportation and cable conduits.

Multimodal HDPE is particularly suitable for processing into pipes and tubes by extrusion moulding. Extrusion moulding in the context of the present invention is defined as a process for shaping of thermoplastic materials, such as polyethylenes, including the steps of providing the thermoplastic material in a mouldable state to a die opening, extruding the thermoplastic material through said die opening and cooling the extruded material to below its softening temperature.

Thermoplastic materials in the context of the present invention are defined as materials that obtain a mouldable state when heated to above a softening temperature, and that return to a solid state upon cooling to below said softening temperature.

Mouldable state in the context of the present invention is defined as a state in which a material can be formed into the desired shape whilst retaining said desired shape upon leaving the mould used to form said desired shape. In extrusion moulding, said die opening functions as said mould.

An important material parameter of polyethylenes is the melt mass flow rate as determined in accordance with ISO 1133-1 (2011), at a temperature of 190° C. and a load of 5.0 kg, further referred to as MFR(5). The MFR(5) of the unimodal polyethylenes according to the present invention may for example be ≤15.0 g/10 min, alternatively ≤13.0 g/10 min, alternatively ≤12.0 g/10 min. The MFR(5) of the unimodal polyethylenes according to the present invention may for example be ≥6.00 g/10 min, alternatively ≥7.00 g/10 min, alternatively ≥8.00 g/10 min. For example, the MFR(5) of the unimodal polyethylenes according to the present invention may for example be ≥6.00 g/10 min and ≤15.0 g/10 min, alternatively for example ≥7.00 g/10 min and ≤13.0 g/10 min, alternatively for example ≥8.00 g/10 min and ≤12.0 g/10 min.

The MFR(5) of the multimodal polyethylenes according to the present invention may for example be ≤100 g/10 min, alternatively ≤50.0 g/10 min, alternatively ≤25.0 g/10 min, alternatively ≤10.0 g/10 min, alternatively ≤5.00 g/10 min, alternatively ≤4.00 g/10 min, alternatively ≤3.00 g/10 min, alternatively ≤2.00 g/10 min, alternatively ≤1.00 g/10 min. The MFR(5) of the multimodal polyethylenes according to the present invention may for example be ≥0.01 g/10 min, alternatively ≥0.05 g/10 min, alternatively ≥0.10 g/10 min, alternatively ≥0.15 g/10 min. For example, the MFR(5) of the multimodal polyethylenes according to the present invention may for example be ≥0.05 g/10 min and ≤10.0 g/10 min, alternatively for example ≥0.10 g/10 min and ≤5.00 g/10 min, alternatively for example ≥0.15 g/10 min and ≤2.00 g/10 min.

Another important material parameter of polyethylenes is the melt mass flow rate as determined in accordance with ISO 1133-1 (2011), at a temperature of 190° C. and a load of 21.6 kg, further referred to as MFR(21.6). The MFR(21.6) of the unimodal polyethylenes according to the present invention may for example be ≤140 g/10 min, alternatively ≤130 g/10 min, alternatively ≤120 g/10 min. The MFR(21.6) of the unimodal polyethylenes according to the present invention may for example be ≥60.0 g/10 min, alternatively ≥70.0 g/10 min, alternatively ≥80.0 g/10 min. For example, the MFR(21.6) of the unimodal polyethylenes according to the present invention may for example be ≥60.0 g/10 min and ≤140 g/10 min, alternatively for example ≥70.0 g/10 min and ≤130 g/10 min, alternatively for example ≥80.0 g/10 min and ≤120 g/10 min.

The MFR(21.6) of the multimodal polyethylenes according to the present invention may for example be ≤500 g/10 min, alternatively ≤200 g/10 min, alternatively ≤100 g/10 min, alternatively ≤50.0 g/10 min, alternatively ≤20.0 g/10 min. The MFR(21.6) of the multimodal polyethylenes according to the present invention may for example be ≥0.50 g/10 min, alternatively ≥1.00 g/10 min, alternatively ≥2.00 g/10 min, alternatively ≥5.00 g/10 min, alternatively ≥10.0 g/10 min. For example, the MFR(21.6) of the multimodal polyethylenes according to the present invention may for example be ≥0.50 g/10 min and ≤200 g/10 min, alternatively for example ≥1.00 g/10 min and ≤100 g/10 min, alternatively for example ≥1.00 g/10 min and ≤50.0 g/10 min.

Reduction of formation of ethane and waxes in the production polyethylenes in a slurry polymerisation process, whilst the polyethylene that is obtained has such desired balance of properties MFR(5), MFR(21.6), and density, may for example be achieved by employing a catalyst system that provides such effects.

Catalyst systems for the production of polyethylenes are well known in the art.

U.S. Pat. No. 6,545,106 describes slurry polymerisation of olefins, in which the catalyst system comprises a solid complex based on magnesium, titanium and halogen, an organoaluminium compound, and an ethyl benzoate as electron donor. Addition of the electron donor reportedly has an effect on the quantity of waxes formed.

WO2013087167 describes the use of 1,2-diethers as electron donors in the production of bimodal HDPE. Addition of the donor is reported to have an effect on the ethane formation.

JP11228635 is directed to the use of 1,2-diethers in the multi-stage production of HDPE. This publication does not indicate an effect of either of hexane-extractable content or ethane formation.

None of these prior art documents teach a solution to decrease both the hexane-extractable content and the ethane formation in slurry polymerisation processes for the production of HDPE, whilst ensuring a desired balance of MFR(5), MFR(21.6) and density as described above.

It is therefore an object of the present invention to provide a catalyst system for the production of polyethylene, such as multimodal HDPE, that provides a reduction of the fraction of waxes and the fraction of ethane formed in the polymerisation process, in particular in the slurry polymerisation process, whilst still obtaining a product with desirable product properties as reflected by MFR(5), MFR(21.6) and density. It is another object of the present invention to provide a process for production of polyethylenes, in particular multimodal HDPE, in the presence of said catalyst system. It is another object of the present invention to provide polyethylenes that are produced in a process for the production of polyethylenes in the presence of said catalyst system.

For example, the fraction of hexane-extractable content may be lower than 2.00% by weight compared to the total weight of the polyethylene. Alternatively, the fraction of hexane-extractable content may be lower than 1.50% by weight. Alternatively, the fraction of hexane-extractable content may be lower than 1.00% by weight.

For example, the fraction of ethane formed during polymerisation may be lower than 0.30% by volume of the head space gas. The head space gas is the quantity of gas that is present in the reactor upon termination of the reaction. Alternatively, the fraction of ethane formed during polymerisation is lower than 0.25% by volume. Alternatively, the fraction of ethane formed during polymerisation is lower than 0.20% by volume.

This object has now been achieved by a catalyst system for the production of polyethylene comprising:
I) the reaction product obtained by reacting
  a) a hydrocarbon solution comprising:
    i. a magnesium-containing compound selected from an organic oxygen-containing magnesium compound and/or a halogen-containing magnesium compound; and
    ii. an organic oxygen-containing titanium compound wherein the molar ratio of magnesium:titanium is lower than 3:1;
  and
  b) an organo aluminium halide having the formula $AlR_nX_{3-n}$ in which R is a hydrocarbon moiety containing 1-10 carbon atoms, X is a halogen and $0<n<3$;
II) an aluminium compound having the formula $AlR'_3$, in which R' is a hydrocarbon moiety containing 1-10 carbon atoms; and
III) one or more of an electron donor selected from the group of 1,2-dialkoxy hydrocarbon compounds
wherein
  the molar ratio of supplied organo aluminium halide I)b) to supplied titanium in I)a) in the preparation of I) is between 5.0 and 7.0; and
  the molar ratio of the one or more of an electron donor III) to the titanium present in the reaction product I) is between 0.05 and 0.40.

The organic oxygen-containing magnesium compound may for example be selected from magnesium alkoxides such as magnesium methylate, magnesium ethylate and magnesium isopropylate, magnesium alkylalkoxides such as magnesium ethylethylate, and carbonized magnesium alkoxides such as magnesium ethyl carbonate. For example, the organic oxygen-containing magnesium compound may be a magnesium alkoxide. For example, the magnesium alkoxide may be magnesium ethoxide ($Mg(OC_2H_5)_2$).

Generally the molar ratio of magnesium:titanium is lower than 3:1 and preferably the molar ratio of magnesium:titanium ranges between 1.5:1 and 3:1.

The halogen-containing magnesium compound may for example be selected from magnesium dihalides and magnesium dihalide complexes. For example, the halide in said magnesium dihalides and magnesium dihalide complexes may be chlorine.

The organic oxygen-containing titanium compound may for example be represented by the formula $[TiO_x(OR)_{4-2x}]_n$, wherein
  R represents an organic moiety
  $0 \leq x \leq 1$
  $1 \leq n \leq 6$ The organic oxygen-containing titanium compound may for example be selected from titanium alkoxides, titanium phenoxides, titanium oxyalkoxides, condensed titanium alkoxides, titanium carboxylates and titanium enolates. For example, the oxygen-containing titanium compound may be selected from titanium alkoxides.

The titanium alkoxide may for example be selected from $Ti(OC_2H_5)_4$, $Ti(OC_3H_7)_4$, $Ti(OC_4H_9)_4$ and $Ti(OC_8H_{17})_4$. For example, the titanium alkoxide may be $Ti(OC_4H_9)_4$.

The organo aluminium halide I)b) may for example be a compound having the formula an $AlR_nX_{3-n}$ wherein R is a hydrocarbon moiety containing 1-10 carbon atoms, X is a halogen and $0<n<3$; alternatively for example $1.5<n<3$.

The organo aluminium halide I)b) may for example be selected from ethyl aluminium dibromide, ethyl aluminium dichloride, propyl aluminium dichloride, n-butyl aluminium dichloride, isobutyl aluminium dichloride, diethyl aluminium chloride and diisobutyl aluminium chloride. For example, X may be chlorine. The organo aluminium halide I)b) may for example be an organo aluminium chloride. For example, the organo aluminium halide I)b) may be ethyl aluminium dichloride.

The aluminium compound having the formula $AlR'_3$ may for example be selected from triethyl aluminium, triisobutyl aluminium, tri-n-hexyl aluminium and trioctyl aluminium. For example, the aluminium compound having the formula $AlR'_3$ may be triethyl aluminium or triisobutyl aluminium. The aluminium compound having the formula $AlR'_3$ functions for example as a cocatalyst.

In an embodiment, the molar ratio of the electron donor III) to the titanium present in I) is between 0.05 and 0.20. Alternatively, the molar ratio of the electron donor III) to the titanium present in I) may for example be between 0.05 and 0.15, alternatively between 0.10 and 0.15.

In an embodiment, the molar ratio of supplied titanium in I)a) to the organo aluminium halide I)b) is between 5.5 and 6.5.

The elemental composition of the catalyst may for example be determined using Neutron Activation Analysis.

The electron donors may be selected from internal and external donors.

According to a preferred embodiment of the invention the one or more of an electron donor III) comprises an external electron donor.

In the context of the present invention, an external electron donor is to be understood as a compound according to the definition of ingredient III) above which is introduced after completion of the formation of ingredient I) of the catalyst system, which contains at least one functional group that is capable of donating at least one pair of electrons to a metal atom. The external electron donor may for example affect the hydrogen sensitivity, ethylene sensitivity and productivity of the catalyst system.

In an embodiment, the production of polyethylene is performed in a slurry polymerisation process.

In an embodiment, the one or more of an electron donor is selected from the group of 1,2-dialkoxy hydrocarbon compounds represented by the formula (I):

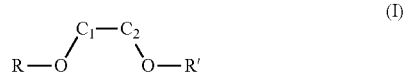

wherein $C_1$-$C_2$ is a connecting group consisting of 2 carbon atoms which are in the $sp^3$ and/or $sp^2$ hybridisation form and wherein the substituents R and R' are hydrocarbon groups with 1-10 carbon atoms and may be the same or different and may optionally be substituted with other heteroatom-containing groups.

The meaning $sp^3$ and/or $sp^2$ hybridisation form used in the context of the present invention is known to the man skilled in the art, and described in for example Chem. Review, 1961 (3), H. Bent, p. 275-311.

In an embodiment, the one or more of an electron donor is selected from the group of 1,2-dialkoxy hydrocarbon compounds of formula (II) or (III):

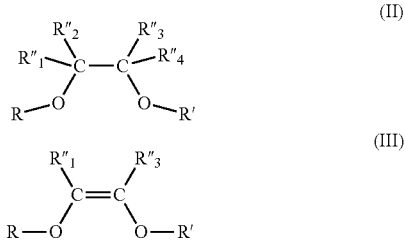

wherein the substituents R" are selected from hydrocarbon groups with 1-10 carbon atoms or hydrogen and may be the same or different and may optionally be substituted with other heteroatom-containing groups, and may join with one or more of other substituents R" to form cyclic groups.

In an embodiment, the electron donor is selected from 1,2-dimethoxybenzene, 1,2,4-trimethoxybenzene, 1,2-diethoxybenzene, 2,3-dimethoxytoluene, 1-allyl-3,4-dimethoxybenzene, 1,2-dimethoxyethane, 1,2-dimethoxy cyclohexane, 1,2-dimethoxypropane, 1,2-dimethoxybutane, or 2,3-dimethoxybutane.

For example, the electron donor may be one or more selected from 1,2-dimethoxybenzene or 1-allyl-3,4-dimethoxybenzene.

In an embodiment, the present invention relates to a process for the production of polyethylene using the catalyst system wherein the polyethylene has a density of ≥935 kg/m³ and ≤975 kg/m³ as measured in accordance with ISO 1183-1 (2012), method A.

In an embodiment, the polyethylene is a multimodal polyethylene.

In an embodiment, the present invention relates to a process for the production of polyethylene wherein the process is a multi-stage slurry polymerisation process comprising at least two stages.

In an embodiment, the weight fraction of the material produced in the first stage of said multi-stage slurry polymerisation process compared to the total weight of the polymer produced may be for example greater than 20.0 wt %, alternatively greater than 30.0 wt %, alternatively greater than 40.0 wt %. In an embodiment, the weight fraction of the material produced in the first stage of said multi-stage slurry polymerisation process compared to the total weight of the polymer produced may be for example less than 80.0 wt %, alternatively less than 70.0 wt %, alternatively less than 60 wt %. In an embodiment, the weight fraction of the material produced in the first stage of said multi-stage slurry polymerisation process compared to the total weight of the polymer produced may be for example between 40.0 wt % and 60.0 wt % of the total product, alternatively between 47 wt % and 58 wt %.

The polymerisation may for example be carried out in the presence of one or more anti-fouling agents. For example, up to 500 ppm of weight of anti-fouling agents may be used, related to the total amount of reactor contents.

The polymerisation may be carried out in the presence of one or more anti-static agents. For example, up to 500 ppm of said one or more anti-static agents used, related to the total amount of reactor contents.

In an embodiment, the present invention relates to a process wherein ingredient I) and II) of the catalyst system are introduced in the first stage of said multi-stage polymerisation process, and wherein ingredient III) is introduced in any one or more of the stages of said multi-stage slurry polymerisation process.

In an embodiment, ingredients I), II) and III) of the catalyst system are introduced in the first stage of the multi-stage polymerisation process.

The electron donor III) may be dosed separately from ingredients I) and II) to the polymerisation process. Alternatively, the electron donor III) may be dosed together with ingredients I) and II) to the polymerisation process. The electron donor III) may be added to ingredients I) and II) of the catalyst system prior to introduction of the catalyst system to the polymerisation process. The electron donor III) may for example be added to ingredient I)a) prior to the addition of ingredient I)b). The electron donor III) may for example be added to ingredients I) prior to the addition of ingredient II). The electron donor III) may be added in pure form or on the form of a solution in a solvent such as liquid aliphatic, cycloaliphatic or aromatic hydrocarbons. The solvent may comprise hydrocarbons containing up to 20 carbon atoms. The solvent may for example comprise linear alkanes, branched alkanes, cycloalkanes, or mixtures thereof. Example of such linear alkanes are propane, n-butane, n-hexane and n-heptane. Examples of such branched alkanes are isobutane, isopentane and isooctane. Examples of cycloalkanes are cyclopentane and cyclohexane.

In an embodiment, the invention relates to polyethylene material produced using the catalyst system by the process wherein the hexane-extractable content of the polyethylene material is less than 2.00 wt %.

The hexane-extractable content of polyethylene in the context of the present invention is determined according to the following method. In an extraction tube, a polyethylene sample of about 5 g of polyethylene, measured with an accuracy of 0.1 mg, was weighed in into an extraction device, such as for example a Büchi B-811 extraction device. The sample was subjected to 40 extraction cycles using 200 ml of n-hexane. After 40 cycles, the n-hexane comprising the solved fraction of the polyethylene sample was collected. Subsequently, the n-hexane was evaporated in a vacuum stove at a temperature of 60° C. for 30 min., resulting in a solid residue. This solid residue represents the fraction of the polyethylene sample that was solved during the extraction process. The weight of the obtained solid residue was determined to an accuracy of 0.1 mg. The hexane-extractable content was then calculated as the weight of the solid residue divided by the weight of the polyethylene sample multiplied by 100%. The hexane-extractable content thus represents the weight fraction of the polyethylene sample solved upon n-hexane extraction compared to the total weight of the polymer sample. The hexane-extractable content was determined to an accuracy of 0.01 wt %.

The fraction of ethane formation is determined via online gas chromatography measurement. During the polymerisation, a sample of the head space gas is taken once per minute. The sample is fed to the gas chromatograph via a transfer line which is kept at such temperature as to avoid the condensation of the sample components. The sample is analyzed to determine the ethane fraction presented as volume fraction of ethane of the total composition of the head space. The fraction of ethane formation is determined to an accuracy of 0.01 v %.

In an embodiment, the present invention relates to the use of the polyethylene material produced using the catalyst system by the process or the polyethylene material in extrusion molding processing.

In an embodiment, the present invention relates to the use of the polyethylene material produced using the catalyst system or by the process or of the polyethylene material for the production of pipes.

In an embodiment, the present invention relates to a pipe produced using polyethylene material produced using the catalyst system or by the process wherein the hexane-extractable content of the polyethylene material is less than 2.00 wt %.

WO2013087167 describes the use of 1,2-diethers as electron donors in the production of bimodal HDPE. The molar ratio of supplied organo aluminium halide I)b) to supplied titanium in I)a) in the preparation of I) is 8.5 (see Comparative Example 7 in the present application).

JP11228635 and JP 03277611 are directed to the use of 1,2-diethers in the multi-stage production of HDPE. In the process according to JP11228635 the molar ratio of magnesium:titanium is 13:1.

The invention will now be illustrated by the following non-limiting examples.

EXAMPLES

Experiment I: Preparation of Ingredient I) of the Catalyst System

Experiment IA: Preparation of Ingredient I)a)

Under a nitrogen atmosphere, 132.5 g of granular $Mg(OC_2H_5)_2$ and 199 ml of $Ti(OC_4H_9)_4$, both at a temperature of 25° C. were introduced into a 2 l round bottom flask equipped with a reflux condenser and a stirrer. Under gentle stirring, the mixture was heated to 180° C., and subsequently stirred for 90 min. A clear liquid was obtained. The contents of the round bottom flask were cooled to 120° C., and subsequently diluted with 1318 g hexane. The contents of the round bottom flask were cooled to 67° C. The temperature was maintained at 67° C. for 120 min, and subsequently cooled down to 25° C. The resulting solution was stored under nitrogen atmosphere. Analysis of the solution showed a titanium concentration of 0.29 mol/l.

Experiment IB: Preparation of Ingredient I)

311 ml hexane and 149 ml of the solution obtained from experiment IA, both at a temperature of 25° C., were introduced into a 1.0 l glass reactor equipped with baffles, a reflux condenser and a stirrer. The reactor was stirred at a stirring speed of 1400 rpm. In a separate Schlenk flask, 75 ml of a 50 wt % solution of ethyl aluminium dichloride in hexane was added to 43 ml hexane. The resulting solution was introduced into the glass reactor gradually over a period of 15 min using a peristaltic pump. The Schlenk flask was rinsed with 45 ml of hexane, and the contents of the flask were also added to the glass reactor. Subsequently, the contents of the glass reactor were refluxed for 120 min, after which the contents of the glass reactor were cooled down to 25° C. A suspension was obtained. The suspension was transferred under nitrogen to a glass filter of grade P16 in accordance with ISO 4793 (1980) to separate the solid material. The obtained solid material was subjected to 3 washings, using 500 ml of hexane for each washing. Subsequent to washing, the solid material was suspended in 500 ml hexane and stored under nitrogen atmosphere. Analysis of the solid material showed the solid material to comprise 10.1 wt % titanium compared to the total weight solid material.

Experiment IC: Preparation of Ingredient I)a)

Under a nitrogen atmosphere, 100.0 g of granular $Mg(OC_2H_5)_2$ and 150 ml of $Ti(OC_4H_9)_4$, both at a temperature of 25° C. were introduced into a 2 l round bottom flask equipped with a reflux condenser and a stirrer. Under gentle stirring, the mixture was heated to 180° C., and subsequently stirred for 90 min. A clear liquid was obtained. The contents of the round bottom flask were cooled to 120° C., and subsequently diluted with 1480 ml hexane. The contents of the round bottom flask were cooled to 67° C. The temperature was maintained at 67° C. for 120 min, and subsequently cooled down to 25° C. The resulting solution was stored under nitrogen atmosphere. Analysis of the solution showed a titanium concentration of 0.25 mol/l.

Experiment ID: Preparation of Ingredient I)

262 ml hexane and 162 ml of the solution obtained from experiment IC, both at a temperature of 25° C., were introduced into a 1.0 l glass reactor equipped with baffles, a reflux condenser and a stirrer. The reactor was stirred at a stirring speed of 1400. In a separate Schlenk flask, 98 ml of a 50 wt % solution of ethyl aluminium dichloride in hexane was added to 56 ml hexane. The resulting solution was introduced into the glass reactor gradually over a period of 15 min using a peristaltic pump. The Schlenk flask was rinsed with 45 ml of hexane, and the contents of the flask were also added to the glass reactor. Subsequently, the contents of the glass reactor were refluxed for 120 min, after which the contents of the glass reactor were cooled down to 25° C. A suspension was obtained. The suspension was transferred under nitrogen to a glass filter of grade P16 in accordance with ISO 4793 (1980) to separate the solid material. The obtained solid material was subjected to 3 washings, using 500 ml of hexane for each washing. Subsequent to washing, the solid material was suspended in 500 ml hexane and stored under nitrogen atmosphere. Analysis of the solid material showed the solid material to comprise 11.1 wt % titanium compared to the total weight solid material.

Experiment II: Polymerisation

Examples 1-5 and Comparative Examples 6-8

Polymerisation was carried out in a 20 l autoclave reactor. 10 l hexane as diluent was fed to the reactor. The reactor was heated to 85° C. The reactor comprised a headspace in which the reactants were dosed in gaseous form. Ethylene was fed to obtain an ethylene partial pressure of the gas in the headspace of the reactor of 1.6 bar. Hydrogen was fed in such quantity as to ensure a hydrogen to ethylene ratio by volume of 0.50 v/v. 1-Butene was fed in such quantities as to ensure a 1-butene to ethylene ratio by volume of 0.07 v/v. 8 mmol of a cocatalyst as presented in table 1 was added to the reactor. A quantity of a solution of an electron donor as presented in table 1 was added in order to obtain a donor:Ti ratio as presented in table 1. A quantity of the slurry obtained in experiment I containing 10 mg of the ingredient I) as indicated in table 1 was dosed. The temperature was maintained at 85° C., and the pressure was kept constant by feeding ethylene. The hydrogen to ethylene ratio by volume was maintained at 0.50 v/v by feeding hydrogen. The 1-butene to ethylene ratio by volume was maintained at 0.07 v/v by feeding 1-butene. The ethylene uptake was monitored to calculate the quantity of polymer produced during the reaction. The reaction was stopped after 120 min by depressurizing the reactor to atmospheric conditions, and the reactor contents were cooled to 30° C., after which the reactor contents were passed over a polyamide filter cloth having a pore size of 25 μm. The polymer powder was collected and subsequently dried.

In table 1, the catalyst composition using in the polymerisation experiments are presented.

TABLE 1

| Example | Catalyst Ingredient I) from experiment | Al:Ti ratio | Electron donor | Donor:Ti ratio | Cocatalyst |
|---|---|---|---|---|---|
| 1 | IB | 6.0 | DMB | 0.10 | TiBA |
| 2 | IB | 6.0 | ME | 0.10 | TiBA |
| 3 | IB | 6.0 | ME | 0.10 | TEA |
| 4 | IB | 6.0 | DMB | 0.05 | TiBA |
| 5 | IB | 6.0 | DMB | 0.50 | TiBA |
| 6 | IB | 6.0 | — | — | TiBA |
| 7 | ID | 8.5 | DMB | 0.25 | TiBA |
| 8 | ID | 8.5 | — | — | TiBA |

In table 1, the Al:Ti ratio represents the molar ratio of supplied titanium in the preparation of ingredient I) of the catalyst system of the present invention to the aluminium halide in ingredient I).

DMB=1,2 dimethoxybenzene
ME=methyl eugenol (1-allyl-3,4-dimethoxybenzene)
TiBA=tri isobutyl aluminium
TEA=triethyl aluminium The donor:Ti ratio represents the molar ratio of the electron donor III) to the titanium present in I).

In table 2, features of the polymers produced and the polymerisation process in examples 1-5 and comparative examples 6-8 are presented.

TABLE 2

| Example | MFR(5) (g/10 min) | MFR(21.6) (g/10 min) | Density (kg/m³) | Hexane-extractable content (wt %) | Ethane formation (v %) |
|---|---|---|---|---|---|
| 1 | 8.1 | 72.2 | 943 | 0.94 | 0.20 |
| 2 | 10.9 | 94.4 | 945 | 0.98 | 0.19 |
| 3 | 10.3 | 88.5 | 945 | 0.65 | 0.19 |
| 4 | 13.1 | 110.5 | 944 | 0.65 | 0.17 |
| 5 | 5.6 | 49.8 | 942 | — | — |
| 6 | 13.4 | 118.2 | 943 | 0.86 | 0.20 |
| 7 | 4.26 | 40.8 | 938 | 2.02 | 0.17 |
| 8 | 11.4 | 113.6 | 942 | 4.30 | 0.38 |

MFR(5) represents the melt mass flow rate as determined in accordance with ISO 1133-1 (2011), at a temperature of 190° C. and a load of 5.0 kg.

MFR(21.6) represents the melt mass flow rate as determined in accordance with ISO 1133-1 (2011), at a temperature of 190° C. and a load of 21.6 kg.

The density is determined in accordance with ISO 1183-1 (2012), method A.

The wt % hexane-extractable content is determined according to the aforementioned method.

The v % of ethane formation is determined according to the aforementioned method.

Examples 1-5, compared to comparative examples 6-8, demonstrate that only by selecting a catalyst system according to the present invention, in which the molar ratio of supplied titanium in I)a) to the aluminium halide I)b) is between 5.0 and 7.0; and the molar ratio of the electron donor III) to the titanium present in I) is between 0.05 and 0.40, result in a reduction of hexane-extractable content formation and ethane formation, whilst resulting in a polymer product having desired melt flow rate as reflected by MFR(5) and MFR(21.6), as well as a desired density.

The invention claimed is:

1. A catalyst system for the production of polyethylene comprising:
   I) the reaction product obtained by reacting
   a) a hydrocarbon solution comprising:
      i. a magnesium-containing compound selected from an organic oxygen-containing magnesium compound and/or a halogen-containing magnesium compound; and
      ii. an organic oxygen-containing titanium compound wherein the molar ratio of magnesium:titanium is lower than 3:1;
   and
   b) an organo aluminium halide having the formula $AlR_nX_{3-n}$ in which R is a hydrocarbon moiety containing 1-10 carbon atoms, X is a halogen and $0<n<3$;
   II) an aluminium compound having the formula $AlR'_3$, in which R' is a hydrocarbon moiety containing 1-10 carbon atoms; and
   III) an electron donor selected from the group of 1,2-dialkoxy hydrocarbon compounds
   wherein
   the molar ratio of supplied organo aluminium halide I)b) to supplied titanium in I)a) in the preparation of I) is between 5.0 and 7.0; and
   the molar ratio of the one or more of an electron donor III) to the titanium present in the reaction product I) is between 0.05 and 0.40.

2. The catalyst system according to claim 1 wherein the electron donor III) comprises an external electron donor.

3. The catalyst system according to claim 1, for the production of polyethylene wherein the production of polyethylene is performed in a slurry polymerisation process.

4. The catalyst system according to claim 1, wherein the electron donor is selected from the group of 1,2-dialkoxy hydrocarbon compounds represented by the formula (I):

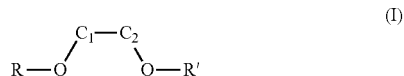

wherein $C_1$-$C_2$ is a connecting group consisting of 2 carbon atoms which are in the $sp^3$ and/or $sp^2$ hybridisation form and wherein the substituents R and R' are hydrocarbon groups with 1-10 carbon atoms and may be the same or different and may optionally be substituted with other heteroatom-containing groups.

5. The catalyst according to claim 1, wherein the electron donor is selected from the group of 1,2-dialkoxy hydrocarbon compounds of formula (II) or (III):

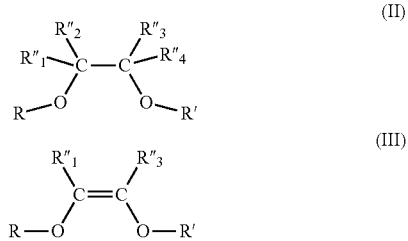

wherein the substituents R″ are selected from hydrocarbon groups with 1-10 carbon atoms or hydrogen and may be the same or different and may optionally be substituted with other heteroatom-containing groups, and may join with one or more of other substituents R″ to form cyclic groups.

6. The catalyst system according to claim 1, wherein the electron donor is selected from 1,2-dimethoxybenzene, 1,2,4-trimethoxybenzene, 1,2-diethoxybenzene, 2,3-dimethoxytoluene, 1-allyl-3,4-dimethoxybenzene, 1,2-dimethoxyethane, 1,2-dimethoxy cyclohexane, 1,2-dimethoxypropane, 1,2-dimethoxybutane, or 2,3-dimethoxybutane.

7. A process for the production of a polyethylene, the process comprising polymerizing ethylene in the presence of the catalyst system according to claim 1 to produce a polyethylene, wherein the polyethylene has a density of ≥935 kg/m³ and ≤975 kg/m³ as measured in accordance with ISO 1183-1 (2012), method A.

8. The process according to claim 7 wherein the polyethylene is a multimodal polyethylene.

9. The process for the production of polyethylene according to claim 7, wherein the process is a multi-stage slurry polymerisation process comprising at least two stages.

10. The process according to claim 9 wherein ingredient I) and II) of the catalyst system are introduced in the first stage of said multi-stage polymerisation process, and wherein ingredient III) is introduced in any of the stages of said multi-stage slurry polymerisation process.

11. The process according to claim 7, wherein the polyethylene has a melt flow rate of greater than or equal to 60.0 g/10 min, as determined in accordance with ISO 1133-1 (2011), at a temperature of 190° C. and a load of 21.6 kg.

12. The process according to claim 7, wherein the polyethylene has a hexane-extractable content of less than 2.00 wt %.

13. The process according to claim 12, wherein the hexane-extractable content is less than 1.50 wt %.

14. The process according to claim 7, wherein a fraction of ethane formed during polymerization is lower than 0.25 volume percent.

15. The process according to claim 7,
wherein a fraction of ethane formed during polymerization is lower than 0.30 volume percent;
wherein the polyethylene has a hexane-extractable content is less than 2.00 wt %; and
wherein the polyethylene has a melt flow rate of greater than or equal to 60.0 g/10 min, as determined in accordance with ISO 1133-1 (2011), at a temperature of 190° C. and a load of 21.6 kg.

16. The process according to claim 15, wherein the hexane-extractable content is less than 1.50 wt %.

17. The process according to claim 15, wherein a fraction of ethane formed during polymerization is lower than 0.25 volume percent.

18. The catalyst system according to claim 1, wherein:
the magnesium-containing compound is magnesium ethoxide;
the organic oxygen-containing titanium compound is $Ti(OC_4H_9)_4$, the molar ratio of magnesium:titanium is equal to or greater than 1.5:1 and lower than 3:1;
the organo aluminium halide having the formula $AlR_nX_{3-n}$ is ethyl aluminium dichloride;
the aluminium compound having the formula $AlR'_3$ is trietyl aluminium or triisobutyl aluminium; and
the electron donor is selected from the group consisting of 1,2-dimethoxybenzene and 1-allyl-3,4-dimethoxybenzene.

* * * * *